US010721214B2

(12) United States Patent
Bhat et al.

(10) Patent No.: US 10,721,214 B2
(45) Date of Patent: Jul. 21, 2020

(54) METHOD TO TRACK SSL SESSION STATES FOR SSL OPTIMIZATION OF SAAS BASED APPLICATIONS

(71) Applicant: Citrix Systems, Inc., Fort Lauderdale, FL (US)

(72) Inventors: Akshata Bhat, Bangalore (IN); Praveen Raja Dhanabalan, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 183 days.

(21) Appl. No.: 15/787,463

(22) Filed: Oct. 18, 2017

(65) Prior Publication Data
US 2019/0116160 A1 Apr. 18, 2019

(51) Int. Cl.
*H04W 80/00* (2009.01)
*H04L 29/06* (2006.01)
*G06F 21/62* (2013.01)
*H04L 29/08* (2006.01)

(52) U.S. Cl.
CPC ...... *H04L 63/0428* (2013.01); *G06F 21/6218* (2013.01); *H04L 63/0281* (2013.01); *H04L 63/08* (2013.01); *H04L 63/102* (2013.01); *H04L 63/166* (2013.01); *H04L 67/28* (2013.01)

(58) Field of Classification Search
CPC ......... H04L 43/10; H04L 43/16; H04L 67/42; H04L 69/16
See application file for complete search history.

(56) References Cited

U.S. PATENT DOCUMENTS

| 7,162,454 | B1 | 1/2007 | Donner et al. | |
|---|---|---|---|---|
| 2001/0032232 | A1* | 10/2001 | Zombek | H04L 1/1635 709/201 |
| 2007/0300291 | A1* | 12/2007 | Bomgaars | H04L 12/2856 726/3 |
| 2008/0162773 | A1* | 7/2008 | Clegg | G06F 3/0611 710/316 |
| 2012/0317496 | A1* | 12/2012 | Liu | H04L 67/2804 715/748 |

(Continued)

OTHER PUBLICATIONS

International Search Report and Written Opinion for International Appl. No. PCT/US2018/055000, dated Dec. 7, 2018.

(Continued)

*Primary Examiner* — Alexander Lagor
*Assistant Examiner* — Kalish K Bell
(74) *Attorney, Agent, or Firm* — Foley & Lardner LLP

(57) ABSTRACT

Described embodiments provide systems and methods for initiating establishment of a connection. The system may include a device intermediary between a client and a server. The device may determine at least one server name indicator (SNI) for an application executing on the client and having a secure session established with the server. The device may determine, for each domain name corresponding to the at least one SNI, a session timeout value for the corresponding domain name. The device may send a message to the client according to each session timeout value, to cause the client to initiate establishment of a connection for the corresponding domain name using the secure session.

20 Claims, 8 Drawing Sheets

(56) References Cited

U.S. PATENT DOCUMENTS

| | | | |
|---|---|---|---|
| 2014/0082706 A1* | 3/2014 | Banford | H04L 67/145 |
| | | | 726/5 |
| 2014/0344326 A1 | 11/2014 | Kamath et al. | |
| 2015/0288514 A1 | 10/2015 | Pahl et al. | |
| 2016/0255047 A1 | 9/2016 | Parthasarathy | |

OTHER PUBLICATIONS

Examination Report for AU Appl. No. 2018351990, dated Apr. 16, 2020.
International Preliminary Report on Patentability for International Appl. No. PCT/US2018/055000, dated Apr. 30, 2020.

* cited by examiner

METHOD TO TRACK SSL SESSION STATES FOR SSL OPTIMIZATION OF SAAS BASED APPLICATIONS

FIELD OF THE DISCLOSURE

This disclosure generally relates to system and methods for secure socket layer (SSL) or transport layer security (TLS) optimization, including but not limited to pre-establishing SSL connections for applications such as software as a service (SaaS) applications.

BACKGROUND

The SSL/TLS protocol allows for establishing secure sessions between client devices and remote servers. The SSL/TLS protocol allows for entity authentication (e.g., server and/or client authentication), secure communications between client and server, and data integrity. A client and server can establish a SSL/TLS session by performing a handshake process during which both parties negotiate and agree on a set of session parameters defining the SSL/TLS session. The session parameters usually include encryption/decryption information to be used to encrypt or decrypt data exchanged during the SSL/TLS established session.

SUMMARY

This Summary is provided to introduce a selection of concepts in a simplified form that are further described below in the Detailed Description. This Summary is not intended to identify key features or essential features, nor is it intended to limit the scope of the claims included herewith.

The present disclosure is directed toward systems and methods of tracking secure socket layer (SSL) or transport layer security (TLS) session state objects to optimize the SSL/TLS protocol for client-server applications, such as software as a service (SaaS) based applications. A client and a server can create a SSL/TLS session by performing a handshake process (e.g., according to a handshake protocol) during which the client and server negotiate and decide on a set of session parameters defining the SSL/TLS session. To enhance session security, a SSL/TLS session may be associated with timeout values on the server and client sides. The timeout values may represent time durations during which both entities are to keep the session in cache memory during an idle state for instance.

A SSL/TLS session may be associated with a plurality of links or domain names. For instance, while a client device may specify a single link or domain name (e.g., associated with a SaaS based application or a webpage) when initiating a SSL/TLS session during handshake, the client may later request access to various other related links or domain names once the SSL/TLS session is established. Access to such links or domain names may involve establishing SSL connections with the servers associated with these links or domain names. Furthermore, requesting access to such links or domain names after an idle period that exceeds session timeout value(s) may lead to re-performing a handshake and establishing a SSL connection. In the current disclosure, embodiments of a mechanism based on SSL optimization to provide better user experience to SaaS based applications (and/or server resources) and/or to speed up connections and loading of data on client devices from servers, is described.

A device intermediary between a client and server may track the SSL session state objects in the client and/or the server. When the session states timeout, the device may send a message (e.g., including a dynamic script) to the client device to cause the client device to pre-establish connections to servers based on Server Name Indicators (SNIs) associated with the SSL/TLS session. This in essence would establish the domain name system (DNS) resolution, the SSL session, and SSL connections in advance. When the client device resumes the SSL/TLS session, the corresponding user can experience a faster response from the servers hosting data requested by the client device.

In one aspect, the present disclosure is directed to embodiments of a system for initiating establishment of a connection. The system may include a device intermediary between a client and a server. The device may determine at least one server name indicator (SNI) for an application executing on the client and having a secure session established with the server. The device may determine, for each domain name corresponding to the at least one SNI, a session timeout value for the corresponding domain name. The device may send a message to the client according to each session timeout value, to cause the client to initiate establishment of a connection for the corresponding domain name using the secure session.

In some embodiments, the secure session may include a secure socket layer (SSL) session, and the message may include a server-sent event (SSE) message. In some embodiments, the application may be configured to access a software as a service (SaaS) based resource of the server. In some embodiments, the device may determine the at least one SNI using historical data of a user of the application accessing one or more resources of the server. In some embodiments, the device may determine the at least one SNI according to access granted to a user of the application, to one or more resources of the server. The access may be granted according to role-based access control (RBAC).

In some embodiments, the device may determine the session timeout values using at least one of a session timeout parameter of the device or a session timeout parameter of the application. In some embodiments, if the application comprises a browser, the device may determine a first session timeout value according to a frequency or interval of client hello messages from the application, when a session timeout parameter of the device is larger in value than that of a session timeout parameter of the application. In some embodiments, if the application comprises a browser, the device may determine a first session timeout value according to a session timeout parameter of the device, when a session timeout parameter of the device is smaller in value than that of a session timeout parameter of the application.

In some embodiments, the secured session may be established for the application to access a webpage of the server, and the webpage may have a link associated with a first domain name. The device may send a first message to the client to cause the client to initiate establishment of a first connection for the first domain name using the secure session. The device may determine a first session timeout value for the first domain name. The device may send a second message to the client according to the first session timeout value, to cause the client to initiate establishment of a second connection for the first domain name using the secure session.

In another aspect, the disclosure is directed to a method of initiating establishment of a connection. The method may include a device intermediary between a client and a server determining at least one server name indicator (SNI) for an application executing on the client and having a secure session established with the server. The method may include the device determining, for each domain name corresponding to the at least one SNI, a session timeout value for the corresponding domain name. The method may include the device sending a message to the client according to each of the determined session timeout values, to cause the client to initiate establishment of a connection for the corresponding domain name using the secure session.

In some embodiments, the secure session may include a secure socket layer (SSL) session, and the message may include a server-sent event (SSE) message. In some embodiments, the application may be configured to access a software as a service (SaaS) based resource of the server. In some embodiments, the method may include the device determining the at least one SNI using historical data of a user of the application accessing one or more resources of the server. In some embodiments, the method may include the device determining the at least one SNI according to access granted to a user of the application, to one or more resources of the server. The access may be granted according to role-based access control (RBAC).

In some embodiments, the method may include the device determining the session timeout values using at least one of a session timeout parameter of the device or a session timeout parameter of the application. In some embodiments, if the application comprises a browser, the method may include the device determining a first session timeout value according to a frequency or interval of client hello messages from the application, when a session timeout parameter of the device is larger in value than that of a session timeout parameter of the application. In some embodiments, if the application comprises a browser, the method may include the device determining a first session timeout value according to a session timeout parameter of the device, when a session timeout parameter of the device is smaller in value than that of a session timeout parameter of the application.

In some embodiments, the secured session may be established for the application to access a webpage of the server, and the webpage may have a link associated with a first domain name. The method may include the device sending a first message to the client to cause the client to initiate establishment of a first connection for the first domain name using the secure session, determining a first session timeout value for the first domain name, and sending a second message to the client according to the first session timeout value, to cause the client to initiate establishment of a second connection for the first domain name using the secure session.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for pre-establishing secure connections associated with secure sessions.

A. Network and Computing Environment

Figure 1A:
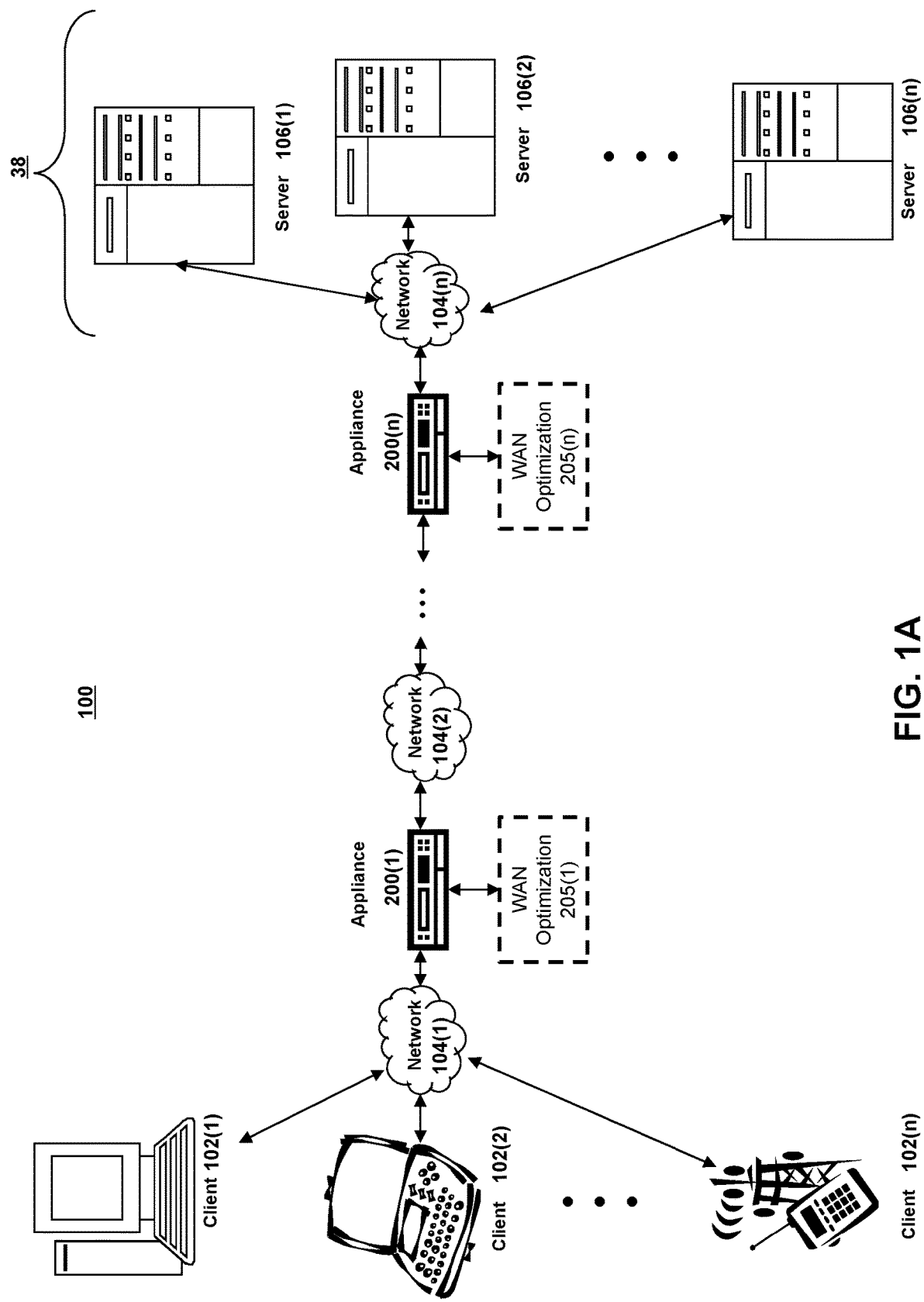
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104(n) (generally referred to as network(s) 104). In some embodiments, a client 102 may communicate with a server 106 via one or more appliances 200(1)-200(n) (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as CloudBridge® products sold by Citrix Systems, Inc. of Fort Lauderdale, Fla.

Figure 1B:
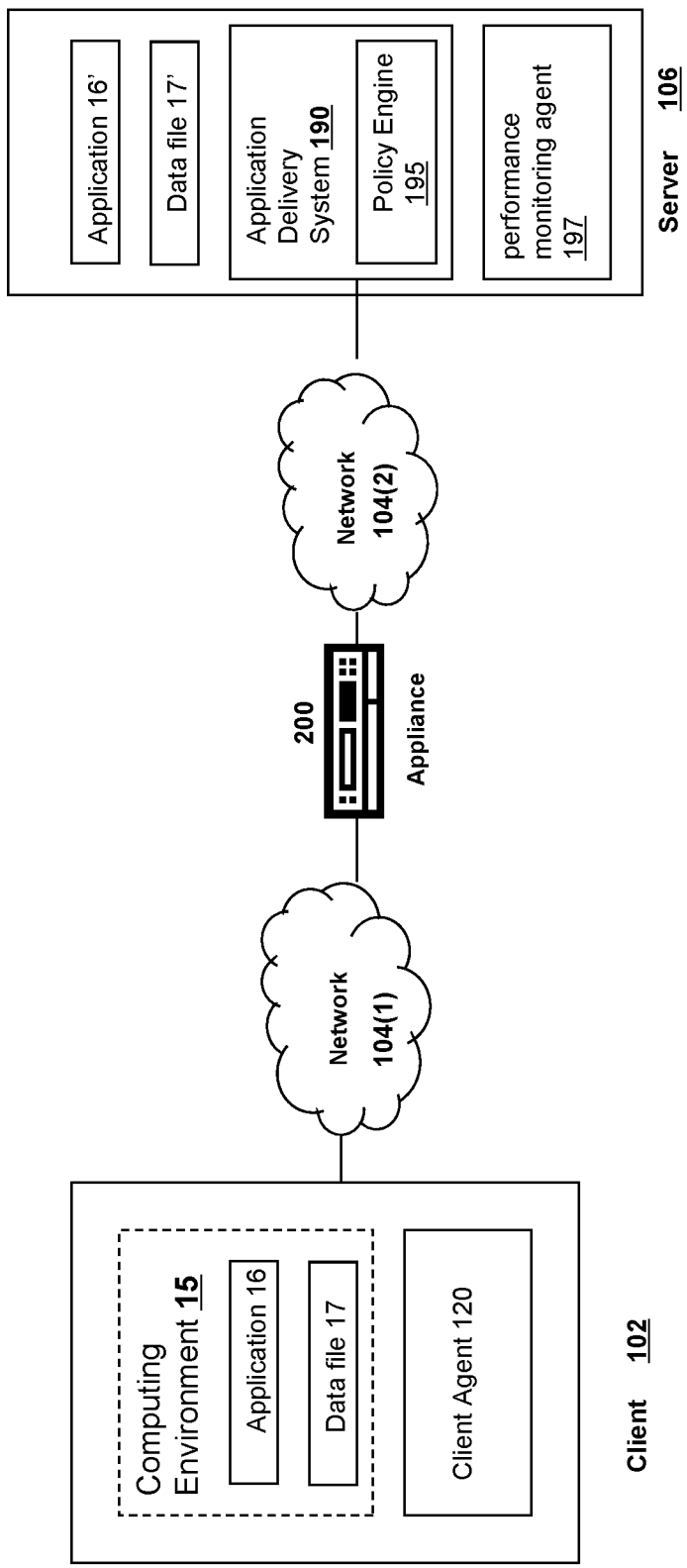
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102

(e.g., client agent 120), servers 106 (e.g., agent 197) or an appliances 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
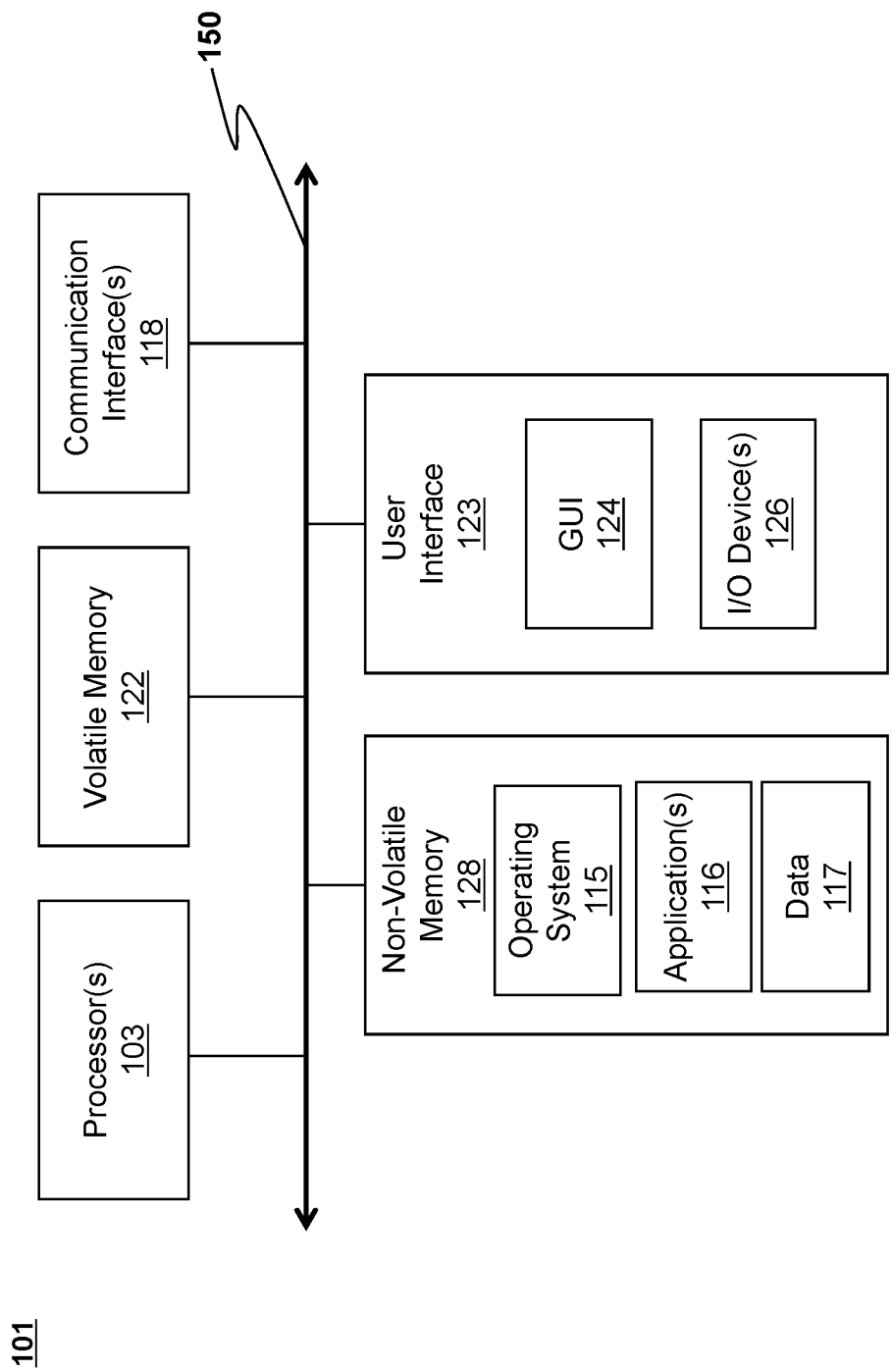
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

B. Appliance Architecture

Figure 2:
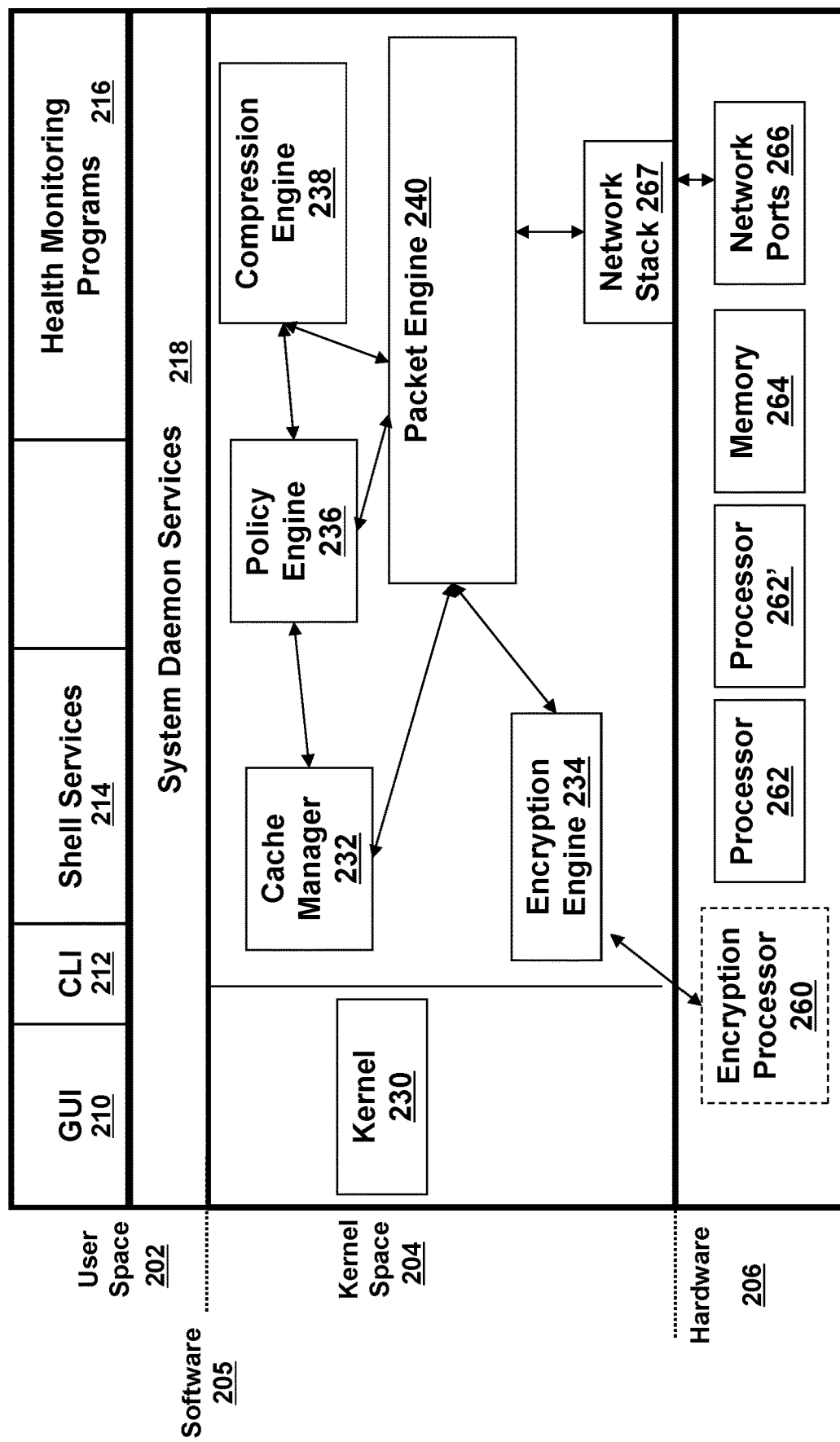
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, Fla., the teachings of which are hereby incorporated herein by reference.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, Fla.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
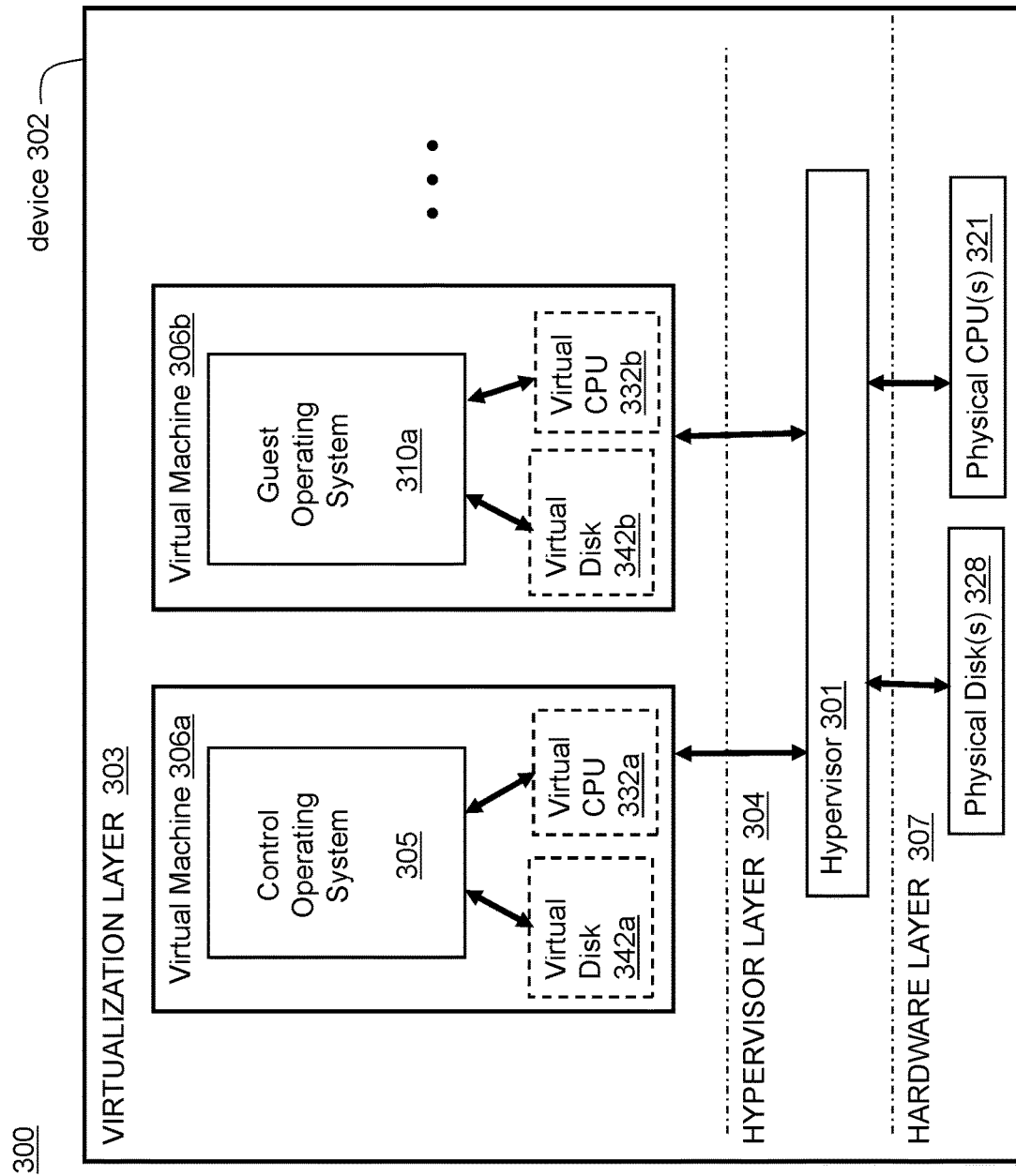
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, Fla., the teachings of which are hereby incorporated herein by reference.

D. Systems and Methods for Providing a Distributed Cluster Architecture

Figure 4:
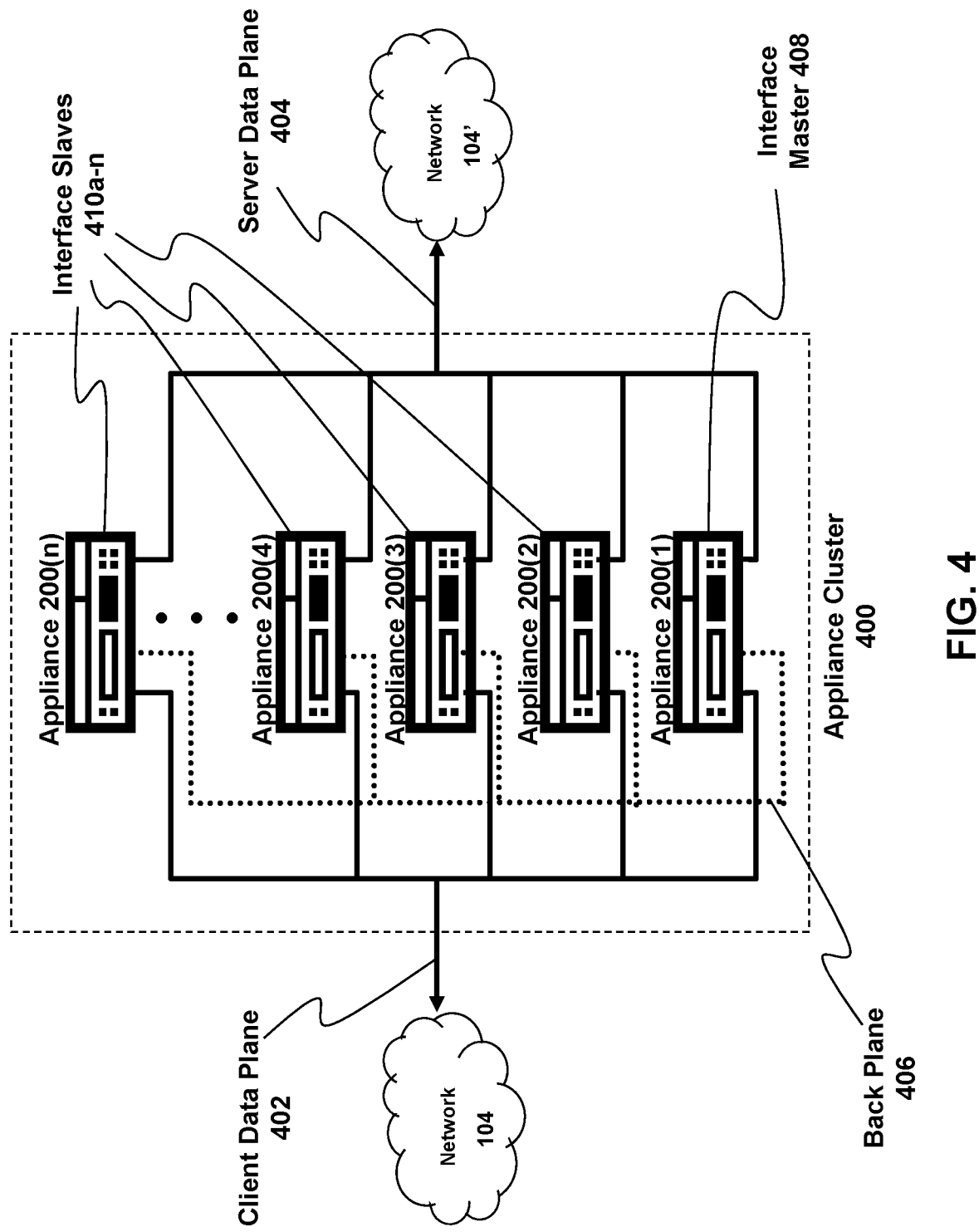
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

Additional details of cluster 400 may be as described in U.S. Pat. No. 9,538,345, issued Jan. 3, 2017 to Citrix Systems, Inc. of Fort Lauderdale, Fla., the teachings of which are hereby incorporated herein by reference.

E. Systems and Methods for Pre-Establishing Secure Connections for a Secure Session The present disclosure is in some aspects directed towards systems and methods of tracking secure socket layer (SSL) or transport layer security (TLS) session state objects to optimize the SSL/TLS protocol for client-server applications, such as software as a service (SaaS) based applications. A client and a server can create a SSL/TLS session by performing a handshake process (via handshake protocol) during which the client and server can negotiate and decide on a set of session parameters defining the SSL/TLS session. To enhance session security, a SSL/TLS session may be associated with timeout values on the server and client sides. The timeout values represent time durations during which both entities are to keep the session in cache memory during an idle state.

A SSL/TLS session may be associated with a plurality of links or domain names. For instance, while a client device may specify a single link or domain name (e.g., associated with a SaaS based application or a webpage) when initiating a SSL/TLS session during handshake, the client may later request access to various other related links or domain names once the SSL/TLS session is established. Access to such links or domain names may involve establishing SSL connections with the servers associated with such links or domain names. Furthermore, requesting access to links or domain names after an idle period exceeding session timeout value(s) may lead to re-performing the handshake and establishing the SSL connection. In the current disclosure, a mechanism based on SSL optimization to provide better user experience to SaaS based applications (and/or server resources), and/or to speed up connections and loading of data on client devices from servers, is described.

A device intermediary between a client and server may track the SSL session state objects in the client and the server. When the session states timeout, the device may send a message (e.g., including a dynamic script) to the client device to cause the client device to pre-establish connections to servers based on Server Name Indicators (SNIs) associated with the SSL/TLS session. This in essence would establish the domain name system (DNS) resolution, the SSL session, and/or SSL connections in advance. When the client device resumes the SSL/TLS session, the corresponding user can experience a faster response from the server(s) hosting data requested by the client device.

Figure 5A:
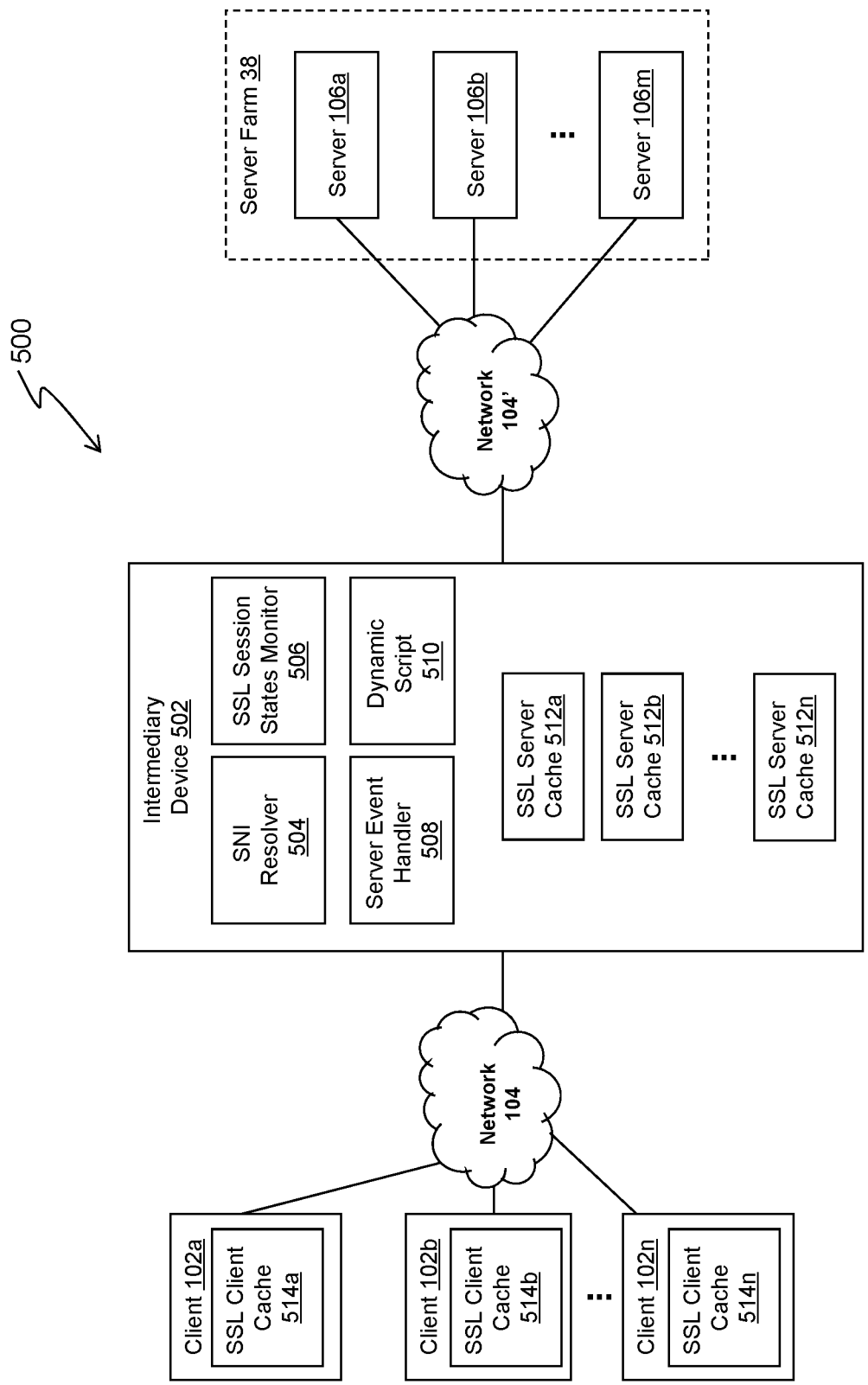
FIG. 5A is a block diagram of a system for initiating establishment of connections for secure sessions of client-server applications, in accordance with an illustrative embodiment.

Referring now to FIG. 5A, an embodiment of a system 500 for initiating establishment of SSL/TLS connections for SSL/TLS sessions of client-server applications, is depicted. In brief overview, the system 500 may include one or more clients 102a-n, an intermediary device 502, and a server farm 38. The server farm 38 may include one or more servers 106a-n. As used herein, the parameters m and n represent integer numbers. The servers 106a-n may include web servers, servers associated with one or more SaaS based applications, other servers, or a combination thereof. The intermediary device 502 may include a server name indicator (SNI) resolver 504, a SSL session states monitor 506, a server event handler 508, a dynamic script 510, and/or one or more SSL server caches 512a-n (referred to hereinafter either individually or collectively as SSL server cache(s) 512). The one or more clients 102a-n may include one or more corresponding SSL client caches 514a-n (referred to hereinafter either individually or collectively as SSL client cache(s) 514). The one or more clients 102a-n may be communicatively connected to the intermediary device 502. The intermediary device 502 may be communicatively connected with the servers 106a-n.

Each of the above-mentioned elements or entities is implemented in hardware, or a combination of hardware and software, in one or more embodiments. For instance, each of these elements or entities can include any application, program, library, script, task, service, process or any type and form of executable instructions executing on hardware of the device 102. The hardware includes circuitry such as one or more processors, for example, as described above in connection with the computing device 101 of FIG. 1C, in one or more embodiments.

The systems and methods of the present solution may be implemented in any type and form of device, including clients, servers and appliances 200. As referenced herein, a "server" may sometimes refer to any device in a client-server relationship, e.g., an appliance in a handshake with a client device. The present systems and methods may be implemented in any intermediary device or gateway, such as any embodiments of the appliance or devices 200 described herein. Some portion of the present systems and methods may be implemented as part of a packet processing engine and/or virtual server of an appliance, for instance. The systems and methods may be implemented in any type and form of environment, including multi-core appliances, virtualized environments and clustered environments described herein. The intermediary device 502 can, for instance, include any embodiments of one or more features of the appliance 200 described above in connection with at least FIGS. 1A-1C, 2, and 4.

A client 102 (e.g., among the clients 102a-n) may request a corresponding SSL/TLS session with the server farm 38 to access one or more resources associated with the one or more servers 106a-n. To establish the SSL/TLS session, the client 102 may perform a respective SSL/TLS handshake process with the intermediary device 502. During the handshake process, the client 102 and the intermediary device 502 may negotiate or agree on a set of SSL/TLS parameters defining or used for establishing that SSL/TLS session. The client 102 may store the SSL/TLS parameters associated with the corresponding SSL/TLS session in a corresponding SSL client cache 514. On the intermediary device side, the intermediary device 502 may store the SSL/TLS parameters associated with the same SSL/TLS session in a corresponding SSL server cache 512. For instance, the SSL client cache 514a and the SSL server cache 512a may store SSL/TLS parameters of a SSL/TLS session between the client 102a and the intermediary device 502, the SSL client cache 514b and the SSL server cache 512b may store SSL/TLS parameters of a SSL/TLS session between the client 102b and the intermediary device 502, and so on and so forth.

The client 102 may establish or create a plurality of SSL/TLS connections to different servers 106 as part of a single SSL/TLS session between the client 102 the server farm 38. The client 102 may establish SSL/TLS connections to one or more resources (e.g., webpages or documents), one or more server (or web) applications, or a combination thereof within the single SSL/TLS session. The resources and/or the server applications may reside on different servers 106. For example, the client 102 may establish a SSL/TLS connection to a webpage (e.g., "webpage-1") corresponding to a link denoted here as "Link-1". The webpage may contain a plurality of links corresponding to a plurality of other webpages, such as "Link-2", "Link-3", and "Link-4" corresponding, respectively, to "webpage-2," webpage-3," and "webpage-4." The client may also establish SSL/TLS connections to the webpages "webpage-2," webpage-3," and "webpage-4." Refreshing or re-connecting to "webpage-1", or interacting with "webpage-1," for example, may lead to creating (or re-establishing) multiple secure connections between the client 102 and one or more servers 106 hosting the webpages "webpage-1," "webpage-2," webpage-3," and/or "webpage-4."

A client 102 may assign a SSL client cache timeout for a corresponding SSL client cache 514. The SSL client cache timeout may represent a time duration for storing the SSL client cache 514 by the client 102, e.g., during an idle state of the corresponding SSL/TLS session. For example, client 102a may assign a first SSL client cache timeout value to the SSL client cache 514a, client 102b may assign a second SSL client cache timeout value to the SSL client cache 514b, and so on and so forth. The assigned SSL client cache timeout values may depend on the corresponding client 102, the corresponding SSL/TLS session, or a combination thereof. When the user of the client 102 is not interacting with the established SSL/TLS session (idle state), the client 102 may keep the corresponding SSL client cache 514 for a time period up to or equal to the SSL client cache timeout. The client 102 may start a timer upon detection of an idle state of the SSL/TLS session. When the timer reaches a value equal to the SSL client cache timeout assigned to the SSL/TLS session, the client 102 may delete or empty the corresponding SSL client cache 514.

The intermediary device 502 may be (or can include) an application delivery controller (ADC) appliance/server. The intermediary device 502 may operate on behalf of the servers 106a-n to perform SSL/TLS processes associated with, for example, establishing, maintaining, or resuming SSL/TLS sessions between the clients 102a-n and the servers 106a-n. For instance, the intermediary device 502 may perform SSL/TLS handshakes, track SSL/TLS session state objects, methods described in this disclosure, or a combination thereof, while the servers 106a-n may perform encryption or decryption of data exchanged between the servers 106a-n and clients 102a-n over established SSL/TLS sessions.

The intermediary device 502 may include the SNI resolver 504 configured to determine, for each SSL/TLS session between a client 102 and the server farm 38, at least one corresponding SNI (or domain name). The SSL/TLS session(s) may be associated with client-server application(s), such as SaaS application(s). For a given client-server application (e.g., SaaS application) executing on a client 102 and associated with a corresponding SSL/TLS session between the client and the server farm 38, the SNI resolver 504 may determine the SNI(s), or domain name(s), associated with that application. While the client 102 may indicate a single server address or a single link when establishing the SSL/TLS session, the client 102 may access one or more other resources (e.g., webpage, document, SaaS based resource, or a combination thereof) hosted by one or more servers 106 of the server farm 38 once the SSL/TLS session is established. For example, an application hosted by the server farm may be distributed across a plurality of servers 106. In accessing the application, the client 102 may browse through various pages or resources via the application and, therefore, access one or more of the servers 106 hosting these pages or the resources.

The SNI resolver 504 may monitor or keep track of (or collect) historical data for various clients 102, various applications hosted by the server farm 38, or a combination thereof. Clients 102 may access applications hosted by the server farm 38 or resources thereof via the intermediary device 502. For each client 102 (or corresponding user), the SNI resolver 504 (or other component of the intermediary device 502) may track, record or store indications of accessed application resources in a database (not shown in FIG. 5A) of, or accessible by, the intermediary device 502. For each client-application pair, the intermediary device 502 may maintain the indications of accessed application resources or statistics thereof in the database. The intermediary device 502 may maintain historical data for each application indicative of previous access events or access statistics associated with various clients 102 on access/connection to resource(s) and/or interaction(s) with application(s). The intermediary device 502 may maintain a profile for each client 102 or a corresponding user. Each profile may include historical data indicative of access events (or corresponding statistics) of application resources by the client 102 or the user associated with the profile.

When a SSL/TLS session for a client-server application is established between a client 102 and one of the servers 106 of the server farm 38, the SNI resolver 504 may access historical data, e.g., from the database accessible by the intermediary device 502, associated with the client 102 and the accessed application. The SNI resolver 504 may identify, based on the historical data, resources of the application previously accessed by the client (e.g., in previous SSL/TLS sessions). The SNI resolver 504 may identify an access frequency or a number of previous access events for each identified resource of the application. The SNI resolver 504 may determine a set of resources, or corresponding SNIs, of the application that the client 102 is most likely to access during the currently established SSL/TLS session, according to the historical data. For instance, the determined set of SNIs may include all SNIs (or corresponding application resources) previously accessed by the client 102, or only those SNIs that has been accessed at least a predefined number of times or meeting at least a predefined frequency of accesses.

The SNI resolver 504 may determine the set of SNIs or corresponding resources associated with the established SSL/TLS session based on resource-based access control (RBAC) information. The RBAC information may be stored in a memory or storage device of, or accessible to, the intermediary device. The RBAC information may include information indicative of access permissions for various clients 102 or corresponding users. For example, a user X (or corresponding client 102) may have permission to access applications (or application resources) A, B, and C, but not application (or application resource) D. The SNI resolver 504 may determine the set of SNIs (or corresponding resources) associated with the established SSL/TLS session as the SNIs (or corresponding resources) to which the client 102 or the corresponding user has access permission.

In some implementations, the SNI resolver 504 may determine the set of SNIs based on the RBAC information, historical data, data indicative of links accessed during the current SSL/TLS session, or a combination thereof. For example, the SNI resolver 504 may first select all SNIs to which the client 102 or the corresponding user has permission to access. The SNI resolver 504 may then filter the selected SNIs based on historical data or data indicative of links (or resources) accessed during the current SSL/TLS session.

The intermediary device 502 may include the SSL session states monitor 506. The SSL session states monitor 506 may monitor or track state objects of each SSL/TLS session established between a corresponding client 102 and the intermediary device 502. For each SSL/TLS session (e.g., associated with a SaaS application), the SSL session states monitor 506 may determine the SSL session timeout values on the server side and the client side, and map the determined SSL session timeout values to SNIs corresponding to that SSL/TLS session (e.g., by storing the information in a table). On the server side, the intermediary device 502 may set or assign, to each of the SSL server caches 512a-n, a corresponding SSL session timeout value (or server cache timeout value). Each of the SSL server caches 512a-n may include (or be associated with) a corresponding server cache timeout value. For a given established SSL/TLS session, the SSL session states monitor 506 may access the corresponding server cache timeout value from the SSL server cache 512 associated with that SSL/TLS session or from a memory of the intermediary device 502.

On the client side, determining the SSL client cache timeout value for a given SSL/TLS session associated with a client 102 may depend on the type of application associated with that SSL/TLS session. In the case where the application associated with the SSL/TLS session and executing on the client 102 is a desktop or mobile client (e.g., a local agent or instance of a SaaS/client-server application), the corresponding client cache timeout value may be equal to (or a function of) a default value, for example, assigned by the intermediary device 502. For example, the SSL session states monitor 506 may determine the SSL client cache timeout value using the function "SSL_get_default_timeout( )."

In the case where the application associated with the SSL/TLS session and executing on the client 102 is a browser, the intermediary device 502 may not have complete control over the SSL/TLS session information on the client side. However, the SSL client cache timeout value (e.g., set by the browser) may be smaller than the corresponding SSL server cache timeout value on the server side. In such a case, the SSL session states monitor 506 (or the intermediary device 502) may monitor the frequency at which the intermediary device 502 receives 'Client Hello' messages (e.g., with zero as the session identifier (ID)) from the client 102, and infer the SSL client cache timeout value based on such frequency. For instance, the SSL session states monitor 506 may determine the SSL client cache timeout value to be equal to the inverse of the frequency of 'Client Hello' messages with zero as the session identifier (ID). The SSL session states monitor 506 may collect and maintain historical data to determine such frequency information. In the case where the SSL client cache timeout value is greater than the corresponding SSL server cache timeout value, the SSL session states monitor 506 may infer the SSL client cache timeout value from the corresponding SSL server cache timeout value. For instance, the SSL session states monitor 506 may estimate the SSL client cache timeout value to be equal to (or a function of) the corresponding SSL server cache timeout value.

The SSL session states monitor 506 (or the intermediary device 502) may map the determined SSL client cache timeout value to each of the domain names or SNIs determined by the SNI resolver 504 (e.g., by maintaining the information in a database or table, or other storage structure). For each SSL/TLS session, the SSL session states monitor 506 (or the intermediary device 502) may maintain a corresponding table (or other data structure) mapping each of the domain names or SNIs determined by the SNI resolver 504 for that SSL/TLS session to the SSL client cache timeout value determined for that SSL/TLS session. Mapping the domain names or SNIs for a given SSL/TLS session to the SSL client cache timeout value determined for that session can allow for efficiently managing SSL connections between the client 102 and the servers 106 associated with that SSL/TLS session.

The intermediary device 502 may include the server event handler 508. The server event handler 508 may manage server-sent events (SSEs) and transmit or push data associated with such events to the clients 102a-n. The SSEs may include data or updates that are automatically sent or pushed by the intermediary device 502 to a client device 102 in relation with an application (or a resource) hosted by the server farm 38 and accessed by the client 102. The server event handler 508 may determine when and what data to push to the client 102. The server event handler 508 may prepare or generate data associated with a SSE before sending to the client 102. The server event handler 508 may send a SSE message to the client 102 to provide and/or activate a dynamic script 510.

The intermediary device 502 may include or provide the dynamic script 510 (e.g., a callback or connection pre-establishment script). The dynamic script 510 may include computer code instructions, which when executed by a client device 102, can cause the client device 102 to establish one or more SSL connections with one or more servers 106 of the server farm 38. The intermediary device 502 may include or provide a plurality of dynamic scripts 510 associated, for example, with a respective plurality of SSL/TLS sessions established between the clients 102a-n and servers 106 of the server farm 38. For each SSL/TLS session, the corresponding dynamic script 510 may include domain names (or SNIs) determined (e.g., by the SNI resolver 504) in association with that SSL/TLS session, corresponding SSL client cache timeout value or an indication thereof, other information associated with the corresponding SSL/TLS session (e.g., SSL/TLS session ID), instructions to establish SSL connections with the domain names, or a combination thereof.

The server event handler 508 may monitor, for each SSL/TLS session, the corresponding SSL client cache timeout value and push or send a message including the dynamic script 510 for that session to the corresponding client 102 based on (or according to) the corresponding SSL client cache timeout value. The server event handler 508 may push or send the dynamic script 510 to the client 102 as a SSE or other type of message. The intermediary device 502 may maintain a generic script including instructions to establish one or more SSL connections by the client 102. The server event handler 508 may use the generic script to generate the dynamic script 510, e.g., by inserting the domain names associated with the determined SNIs, an indication of the SSL client cache timeout, the SSL/TLS session ID, or a combination thereof into the generic script. The server event handler 508 may initiate a timer once an idle state of the SSL/TLS session is detected. Once the timer's value is equal to or greater than the SSL client cache timeout value, the server event handler 508 may push the dynamic script 510 to the client 102. In some implementations, the server event handler 508 may push the dynamic script 510 to the client 102 prior to the timer's value reaching the SSL client cache timeout value. In such implementations, the dynamic script 510 may include an indication of tie instance at which the client 102 is to establish SSL connections with the domain names indicated in the dynamic script 510.

Upon receiving the dynamic script 510, the client 102 may execute the dynamic script 510 to pre-establish SSL connections with servers 106 associated with the domain names indicated in the dynamic script 510. Pre-establishing the SSL connections may include the client 102 initiating an abbreviated handshake with the intermediary device 502 to reuse the originally established SSL/TLS session (e.g., with timed out SSL client cache), and establish the SSL connections. In the abbreviated handshake, the client 102 may send a "Client Hello" message including the SSL/TLS session ID or a session ticket. The session ticket may include information defining (or associated with) the previously established SSL/TLS session between the client 102 and the intermediary device 502. In response, the intermediary device 502 may resume the SSL/TLS session based on previously negotiated (e.g., during a previous full handshake process) session parameters. The intermediary device 502 may identify the previously negotiated session parameters based on the SSL/TLS session ID in the received "Client Hello" message. For instance, the intermediary device 502 may identify a SSL server cache 512 (or session data stored in a memory of, or accessible by, the intermediary device 512) based on the received session ID. In the case where a session ticket is used in the "Client Hello" message, the intermediary device 502 may use the session parameters indicated in the session ticket. In the abbreviated handshake (or session reuse process), the intermediary device 502 and the client 102 may use previously negotiated session encryption/decryption information and skip re-generating such information. Since generating the session encryption/decryption information is computationally demanding and time consuming, using session reuse (or an abbreviated handshake) can reduce latency and improve computational efficiency as compared to performing a full handshake. In particular, the abbreviated handshake can reduce central processing unit (CPU) usage, and/or speed up the pre-establishing of the SSL connections.

In one illustrative and non-limiting example, the dynamic script 510 may include four links indicative of four domain names associated with the application accessed by the client 102. Upon establishing the SSL/TLS session, the intermediary device 502 (or the SNI resolver 504) may identify SNIs corresponding to these links as most likely to be accessed by the client 102, and can send a first message (or dynamic script 510) to the client 102 to cause establishment of connections to such links (or corresponding servers 106). When the session timeout is reached (or before this is reached, or in anticipating of reaching this timeout), the intermediary device 502 may send a second message (or dynamic script 510) to pre-establish connections to the same links again. Executing the dynamic script 102 may cause the client 102 to pre-establish SSL connections with the servers 106 associated with the four links. Once the SSL connections are pre-established, the client 102 can experience a faster loading upon resuming the session (e.g., by clicking on one of the four links associated with the application previously accessed by the client). In particular, when the user of client 102 accesses again the application after an idle period and clicks on one of the links, the resource or data associated with that link may be loaded relatively faster to the client 102. The faster loading can be due to the fact that the domain name system (DNS) resolution for that link (or domain name) is already performed, the SSL/TLS session is re-established, and/or the connection with the corresponding server 106 is already established.

Figure 5B:
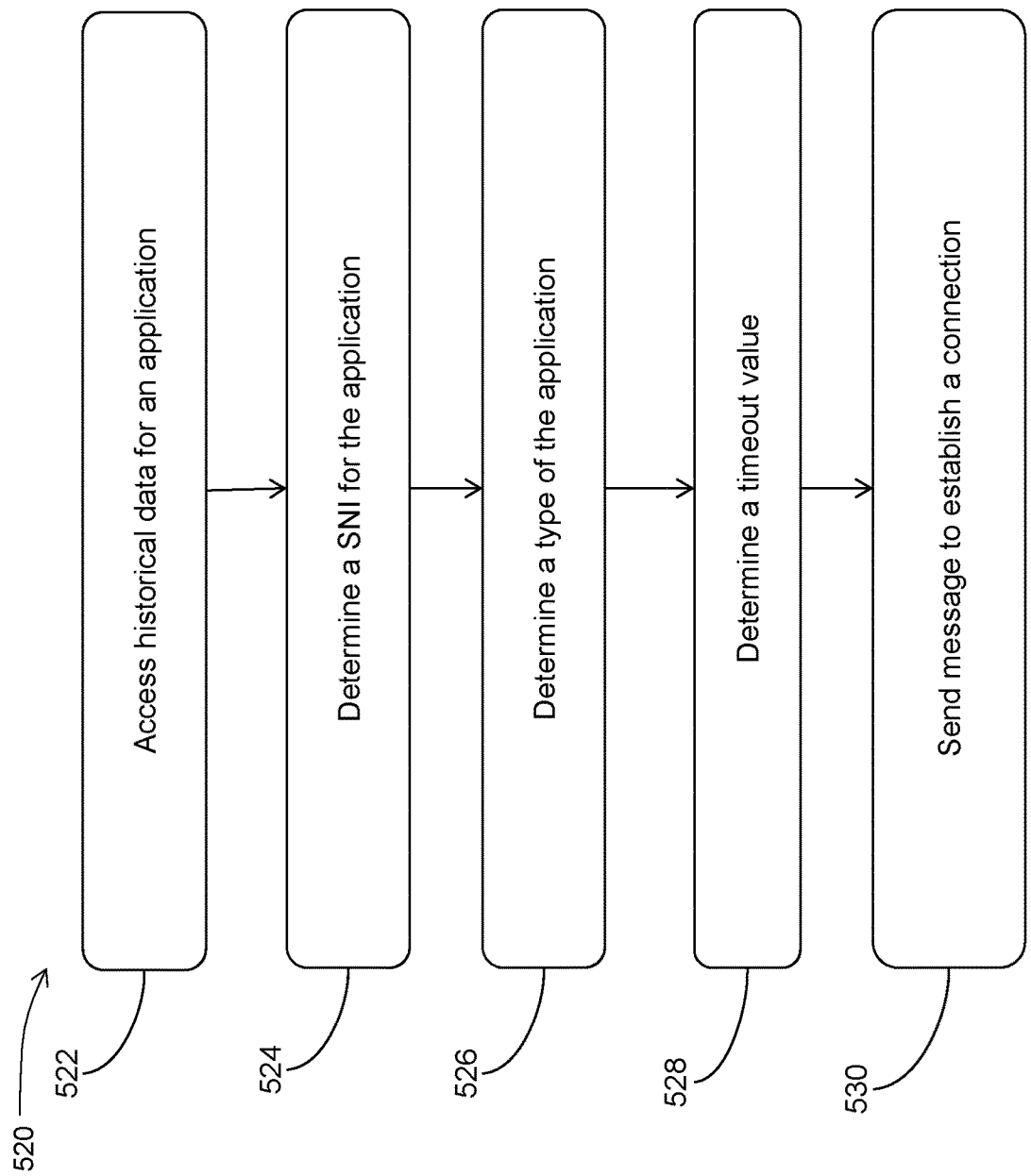
FIG. 5B is a flow diagram of a method for initiating establishment of a connection, in accordance with an illustrative embodiment.

Referring now to FIG. 5B, depicted is a flow diagram of a method 520 for initiating establishment of a connection. The functionalities of the method 580 may be implemented using the system 500 described above. In brief overview, an intermediary device between a client and a server may access historical data of the application (522). The intermediary device may determine at least one server name indicator (SNI) for an application (524). The application may execute on the client and have a secure session established with the server. In some embodiments, the intermediary device 502 may determine a type of the application (526). The intermediary device may determine a session timeout value (528). The intermediary device may determine, for each domain name corresponding to the at least one SNI, a session timeout value for the corresponding domain name. The intermediary device may send a message to establish a connection (530). The intermediary device may send the message to the client according to each of the determined session timeout values, to cause the client to initiate establishment of a connection for the corresponding domain name using the secure session.

In some embodiments, a client 102 may establish a SSL/TLS session to access a client-server application (e.g., SaaS application) or a server resource from a server 106. In establishing the SSL/TLS session, the client 102 may initiate a SSL handshake process with an intermediary device 502 acting on behalf of the server 106. Both the client 102 and the intermediary device 502 may negotiate and agree on a set of session parameters defining the SSL/TLS session. The intermediary device 502 and the client 102 may store session caches (e.g., SSL server cache 514 and SSL client cache 512, respectively) including the negotiated session parameters. Each of the session caches may be associated with a corresponding timeout value.

Referring to (522), and in some embodiments, the intermediary device 502 may access historical data of the application. The intermediary device 502 may use the historical data to determine an SNI for the application. The intermediary device 502 may collect and maintain historical access data for the client 102, a plurality of other clients 102, the requested application or server resource, other applications or server resources hosted by the server farm 38, or a combination thereof. The intermediary device may intercept access requests (e.g., uniform resource locator (URL) requests) for applications or resources from clients 102, and record indications of (or information related to) such requests. For each client 102 (or corresponding user), the intermediary device 502 may store indications of accessed application resources in a database of, or accessible by, the intermediary device 502. For each client-application pair, the intermediary device 502 may maintain the indications of accessed application resources or statistics thereof in the database. The intermediary device 502 may maintain historical data for each application indicative of previous access events or access statistics associated with various clients 102. The intermediary device 502 may maintain a profile for each client 102 or a corresponding user. Each profile may include historical data indicative of access events (or corresponding statistics) of application resources by the client 102 or the user associated with the profile.

The intermediary device 502 may access historical data, e.g., from the database accessible by the intermediary device 502, associated with the client 102 initiating the SSL/TLS session, the application or server resource requested when establishing the SSL/TLS session, or a combination thereof. The intermediary device 502 may identify, based on the historical data, links (or domain names) of the application previously accessed by the client 102 (e.g., in previous SSL/TLS sessions). The intermediary device 502 may identify an access frequency or a number of previous access events for each identified link (or domain name) of the originally requested application or server resource.

Referring to (524), and in some embodiments, the intermediary device 502 may determine a SNI for the application. The intermediary device 502 may determine at least one SNI (or domain name) associated with the established SSL/TLS session. The client-server application (e.g., SaaS application) or the server resource requested when establishing the SSL/TLS session may be associated with one or more other links corresponding to one or more SNIs or one or more domain names. While the client 102 may indicate a single server address or link when establishing the SSL/TLS session, the client 102 may access one or more other resources (e.g., webpage, document, SaaS based resource, or a combination thereof) hosted by one or more other servers 106 of the server farm 38 once the SSL/TLS session is established. For example, an application hosted by the server farm may have components and/or resources that are distributed across a plurality of servers 106. In accessing the application, the client 102 may request or access various pages or resources of the application and, therefore, access one or more of the servers 106 hosting these pages or the resources. The intermediary device 502 may determine the SNI(s), or domain name(s), associated with the SSL/TLS session (or corresponding client-server application or server resource).

The intermediary device 502 may determine a set of links, and/or corresponding SNIs, of the application that the client 102 is most likely to access during the currently established SSL/TLS session, based on the historical data. For instance, the determined set of SNIs may include all SNIs (or corresponding application resources) previously accessed by the client 102, or only those SNIs accessed at least a given number of times or meeting at least a given frequency of accesses.

The intermediary device 502 may determine the set of SNIs or corresponding resources associated with the established SSL/TLS session based access permissions granted to the client 102 or the corresponding user. For instance, the intermediary device 502 may determine the set of SNIs based on resource-based access control (RBAC) information. The RBAC information may be stored in a memory or storage device of, or accessible to, the intermediary device 502. The RBAC information may include information indicative of access permissions for the client 102 or the corresponding user. The intermediary device 502 may determine the set of SNIs associated with the established SSL/TLS session as comprising the SNIs to which the client 102 or the corresponding user has access permission. The intermediary device 502 may determine the set of SNIs based on the RBAC information, historical data, data indicative of links accessed during the current SSL/TLS session, or a combination thereof. For example, the intermediary device 502 may first select all SNIs (or corresponding applications or resources) to which the client 102 or the corresponding user has permission to access. The intermediary device 502 may then filter the selected SNIs based on historical data or data indicative of links (or resources) accessed during the current SSL/TLS session. For example, the intermediary device 502 may consider, among the SNIs accessible to the client 102, only those that were frequently accessed in prior sessions by the client 102 or other clients 102.

Referring to (526), and in some embodiments, the intermediary device 502 may determine a type of the application. The intermediary device 502 may determine a session timeout value according to the type of the application. Referring to (528), and in some embodiments, the intermediary device 502 may determine a session timeout value. The intermediary device 502 may determine a session timeout value for the established session and map the session timeout value to a domain name corresponding to the at least one SNI. The intermediary device 502 may monitor or track state objects of the established SSL/TLS session. The intermediary device 502 may determine the SSL session timeout values on the server side and the client side, and map the determined SSL session timeout values to SNIs corresponding to the SSL/TLS session. On the server side, the intermediary device 502 may set or assign, to each of the SSL server caches 512a-n, a corresponding SSL session timeout value (or server cache timeout value). Each of the SSL server caches 512a-n may include (or be associated with) a corresponding server cache timeout value. The intermediary device 502 may access the server cache timeout value from the SSL server cache 512 associated with the established SSL/TLS session or from a memory of the intermediary device 502.

On the client side, determining the SSL client cache timeout value for a given SSL/TLS session associated with a client 102 may depend on the type of application associated with the established SSL/TLS session. In the case where the application associated with the SSL/TLS session and executing on the client 102 is a desktop or mobile client (e.g., instance or local agent of the client-server application), the corresponding client cache timeout value may be equal to a default value, for example, assigned by the intermediary device 502. For example, the intermediary device 502 may determine the SSL client cache timeout value using the function "SSL_get_default_timeout( )."

In the case where the application associated with the SSL/TLS session and executing on the client 102 is a browser, the intermediary device 502 may not have complete control over the SSL/TLS session information on the client side. However, the SSL client cache timeout value (e.g., set by the browser) may be smaller than the corresponding SSL server cache timeout value on the server side. In such case, the intermediary device 502 may monitor the frequency at which the intermediary device 502 receives 'Client Hello' messages (e.g., with zero as the session identifier (ID)) from the client 102, and infer the SSL client cache timeout value based on such frequency. For instance, the intermediary device 502 may determine the SSL client cache timeout value to be equal to the inverse of the frequency of 'Client Hello' messages with zero as the session identifier (ID). The intermediary device 502 may collect and maintain historical data to determine such frequency information. In the case where the SSL client cache timeout value is greater than the corresponding SSL server cache timeout value, the intermediary device 502 may infer the SSL client cache timeout value from the corresponding SSL server cache timeout value. For instance, the intermediary device 502 may estimate the SSL client cache timeout value to be equal to (or a function of) the corresponding SSL server cache timeout value.

The intermediary device 502 may map the determined SSL client cache timeout value to each of the domain names or SNIs determined for the established SSL/TLS session. The intermediary device 502 may store or maintain a table (or other data structure) mapping each of the domain names or SNIs associated with the SSL/TLS session to the SSL client cache timeout value determined for the SSL/TLS session. Such mapping information can be used for efficient and reliable management and ore-establishment of SSL connections to the determined SNIs or corresponding domain names.

Referring to (530), and in some embodiments, the intermediary device 502 may send a message to establish a connection. The intermediary device 502 may send a message to the client 102 according to the determined session timeout value, to cause the client to initiate establishment of connections to the domain names corresponding to the at least one SNI using the secure session. The message may include parameters for use by the client 102 to initiate establishment of the connections to the domain names. In some implementations, the message may include computer code instructions (e.g., dynamic script 510), which when executed by the client device 102, can cause the client device to initiate pre-establishment/establishment of SSL connections associated with the domain names or SNI(s).

The intermediary device 502 may monitor, for the SSL/TLS session, the corresponding SSL client cache timeout value and push or send the message to the client 102 based on (or according to) the corresponding SSL client cache timeout value. The intermediary device 502 may push or send the message to the client 102 as a server-sent event (SSE) or other type of message. The intermediary device 502 may initiate a timer once an idle state of the SSL/TLS session is detected. Once the timer's value is equal to or greater than the SSL client cache timeout value, the intermediary device 502 may push or send the message to the client 102. In some implementations, the intermediary device 502 may push or send the message to the client 102 prior to or in anticipation of the timer's value reaching the SSL client cache timeout value. In such implementations, the message may include an indication of a time instance and/or trigger condition at which the client 102 is to initiate pre-establishing the SSL connections to the domain names or corresponding servers 106, for example.

Upon receiving the message, the client 102 may initiate an abbreviated handshake with the intermediary device 502 to reuse the originally established SSL/TLS session, and establish the SSL connections to the domain names corresponding to the at least one SNI. The abbreviated SSL handshake (or session reuse) may include the client 102 sending the session ID or a session ticket to the intermediary device in a "Client Hello" message, or any subset or variant of an SSL handshake). The intermediary device 502 and the client 102 may use previously negotiated session encryption/decryption information and can skip re-generating such information, therefore, saving on CPU usage, reducing the amount of data exchanged during the handshake, and/or speeding up the handshake process.

For example, upon establishing the SSL/TLS session, the intermediary device 502 may identify SNIs corresponding to links associated with an accessed application (e.g., identified to be most likely to be accessed by the client 102), and send a first message (or the dynamic script 510) to the client 102 to cause establishment of connections to such links (or corresponding servers 106). When the session timeout is reached, the intermediary device 502 may send a second message (or dynamic script 510) to pre-establish connections to the same links again. Executing the dynamic script 102 may cause the client 102 to pre-establish SSL connections with the servers 106 associated with the four links. Once the SSL connections are pre-established, the client 102 can experience a faster loading upon resuming the session (e.g., upon clicking on one of the links associated with the application previously accessed by the client). When the client 102 or the corresponding user resumes the SSL/TLS session and requests access to one of the domain names or links to which connection was pre-established, the client 102 can experience fast loading of data associated with that domain name since the SSL/TLS session was already re-established and the connection to the domain name was already pre-established prior to the client's request. Accordingly, the method 502 leads to improved user experience.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A system for initiating establishment of a connection, the system comprising:
   a device intermediary between a client and a server, the device configured to:
   determine at least one server name indicator (SNI) for an application executing on the client and having a secure session established with the server;
   determine, for each domain name corresponding to the at least one SNI, a session timeout value for the corresponding domain name; and
   send a message to the client according to each session timeout value, to cause the client to initiate establishment of a connection for the corresponding domain name using the secure session.

2. The system of claim 1, wherein the secure session comprises a secure socket layer (SSL) session, and the message comprises a server-sent event (SSE) message.

3. The system of claim 1, wherein the application is configured to access a software as a service (SaaS) based resource of the server.

4. The system of claim 1, wherein the device is configured to determine the at least one SNI using historical data of a user of the application accessing one or more resources of the server.

5. The system of claim 1, wherein the device is configured to determine the at least one SNI according to access granted to a user of the application, to one or more resources of the server.

6. The system of claim 5, wherein the access is granted according to role-base access control (RBAC).

7. The system of claim 1, wherein the device is configured to determine the session timeout values using at least one of: a session timeout parameter of the device or a session timeout parameter of the application.

8. The system of claim 1, wherein if the application comprises a browser, determining a first session timeout value according to a frequency or interval of client hello messages from the application, when a session timeout parameter of the device is larger in value than that of a session timeout parameter of the application.

9. The system of claim 1, wherein if the application comprises a browser, determining a first session timeout value according to a session timeout parameter of the device, when a session timeout parameter of the device is smaller in value than that of a session timeout parameter of the application.

10. The system of claim 1, wherein the secured session is established for the application to access a webpage of the server, and the webpage has a link associated with a first domain name, and the device is further configured to:
    send a first message to the client to cause the client to initiate establishment of a first connection for the first domain name using the secure session;
    determine a first session timeout value for the first domain name, and
    send a second message to the client according to the first session timeout value, to cause the client to initiate establishment of a second connection for the first domain name using the secure session.

11. A method for initiating establishment of a connection, the method comprising:
    determining, by a device intermediary between a client and a server, at least one server name indicator (SNI) for an application executing on the client and having a secure session established with the server;

determining, by the device for each domain name corresponding to the at least one SNI, a session timeout value for the corresponding domain name; and sending, by the device, a message to the client according to each of the determined session timeout values, to cause the client to initiate establishment of a connection for the corresponding domain name using the secure session.

12. The method of claim 11, wherein the secure session comprises a secure socket layer (SSL) session, and the message comprises a server-sent event (SSE) message.

13. The method of claim 11, wherein the application is configured to access a software as a service (SaaS) based resource of the server.

14. The method of claim 11, further comprising determining the at least one SNI using historical data of a user of the application accessing one or more resources of the server.

15. The method of claim 11, further comprising determining the at least one SNI according to access granted to a user of the application, to one or more resources of the server.

16. The method of claim 15, wherein the access is granted according to role-base access control (RBAC).

17. The method of claim 11, further comprising determining the session timeout values using at least one of: a session timeout parameter of the device or a session timeout parameter of the application.

18. The method of claim 11, wherein if the application comprises a browser, the method further comprises determining a first session timeout value according to a frequency or interval of client hello messages from the application, when a session timeout parameter of the device is larger in value than that of a session timeout parameter of the application.

19. The method of claim 11, wherein if the application comprises a browser, the method further comprises determining a first session timeout value according to a session timeout parameter of the device, when a session timeout parameter of the device is smaller in value than that of a session timeout parameter of the application.

20. The method of claim 11, wherein the secured session is established for the application to access a webpage of the server, and the webpage has a link associated with a first domain name, the method further comprising:

sending a first message to the client to cause the client to initiate establishment of a first connection for the first domain name using the secure session;

determining a first session timeout value for the first domain name, and sending a second message to the client according to the first session timeout value, to cause the client to initiate establishment of a second connection for the first domain name using the secure session.

* * * * *